United States Patent
Fischer et al.

(10) Patent No.: US 8,342,726 B2
(45) Date of Patent: Jan. 1, 2013

(54) VEHICLE HEADLIGHT HAVING PLURAL LIGHT SOURCES AND LENSES

(75) Inventors: Jens Fischer, Schleiz (DE); Steffen Holtz, Jena (DE)

(73) Assignee: Docter Optics GmbH, Neustadt an der Orla (DE)

( * ) Notice: Subject to any disclaimer, the term of this patent is extended or adjusted under 35 U.S.C. 154(b) by 675 days.

(21) Appl. No.: 11/991,127

(22) PCT Filed: Aug. 8, 2006

(86) PCT No.: PCT/EP2006/007820
§ 371 (c)(1),
(2), (4) Date: Dec. 4, 2009

(87) PCT Pub. No.: WO2007/025637
PCT Pub. Date: Mar. 8, 2007

(65) Prior Publication Data
US 2010/0290242 A1 Nov. 18, 2010

(30) Foreign Application Priority Data
Sep. 1, 2005 (DE) .................. 10 2005 041 682

(51) Int. Cl.
*F21V 5/04* (2006.01)
(52) U.S. Cl. ........ 362/521; 396/520; 396/507; 396/244; 396/311.06
(58) Field of Classification Search .................. 362/543, 362/544, 545, 237, 244, 249.02, 311.01, 362/311.02, 520, 521, 507, 311.06
See application file for complete search history.

(56) References Cited

U.S. PATENT DOCUMENTS

| | | | | |
|---|---|---|---|---|
| 2,343,754 A | * | 3/1944 | Donley | 362/540 |
| 4,330,813 A | * | 5/1982 | Deutsch | 362/244 |
| 4,935,665 A | * | 6/1990 | Murata | 362/545 |
| 5,158,350 A | | 10/1992 | Sato | |
| 5,488,512 A | | 1/1996 | Muchel | |
| 5,515,253 A | * | 5/1996 | Sjobom | 362/244 |
| 6,193,400 B1 | | 2/2001 | Schuster et al. | |
| 6,578,997 B2 | | 6/2003 | Futami | |
| 6,776,513 B2 | | 8/2004 | Albou | |
| 6,891,333 B2 | | 5/2005 | Tatsukawa et al. | |
| 7,055,996 B2 | * | 6/2006 | Pond et al. | 362/498 |
| 7,070,310 B2 | * | 7/2006 | Pond et al. | 362/545 |

(Continued)

FOREIGN PATENT DOCUMENTS

DE 42 03 253 8/1992

(Continued)

OTHER PUBLICATIONS

Notice of the Reason for Refusal, mailed on Aug. 2, 2011, issued in corresponding Japanese Patent Application No. 2008-528376.

(Continued)

*Primary Examiner* — Ismael Negron
(74) *Attorney, Agent, or Firm* — Kenyon & Kenyon LLP

(57) ABSTRACT

A vehicle headlamp includes a first light source, at least one second light source and an integrally designed, transparent shaped part. The shaped part includes a first optical structure for orienting light radiated by the first light source and at least one second optical structure for orienting light radiated by the second light source. The first optical structure and the second optical structure each have a continuously curved surface or a continuous, curved surface with an extent of at least in each case half a centimeter, in particular one centimeter, in two orthogonal directions.

18 Claims, 12 Drawing Sheets

U.S. PATENT DOCUMENTS

| | | | |
|---|---|---|---|
| 7,204,606 B2 * | 4/2007 | Brass et al. | 362/231 |
| 8,029,157 B2 * | 10/2011 | Li et al. | 362/249.02 |
| 2003/0053310 A1 * | 3/2003 | Sommers | 362/231 |
| 2003/0072167 A1 | 4/2003 | Albou | |
| 2003/0193815 A1 * | 10/2003 | Mishimagi | 362/522 |

FOREIGN PATENT DOCUMENTS

| | | |
|---|---|---|
| DE | 195 39 422 | 4/1997 |
| DE | 196 27 936 | 1/1998 |
| DE | 198 14 480 | 10/1999 |
| DE | 101 00 206 | 7/2001 |
| DE | 103 42 635 | 4/2005 |
| EP | 1 008 801 | 6/2000 |
| JP | 5-87708 | 11/1993 |
| JP | 7-56095 | 3/1995 |
| JP | 2003-151318 | 5/2003 |
| JP | 2004-095480 | 3/2004 |
| WO | WO 02/33449 | 4/2002 |

OTHER PUBLICATIONS

International Preliminary Report on Patentability dated Aug. 14, 2008, International Application No. PCT/EP2006/007820 filed Aug. 8, 2006.

* cited by examiner

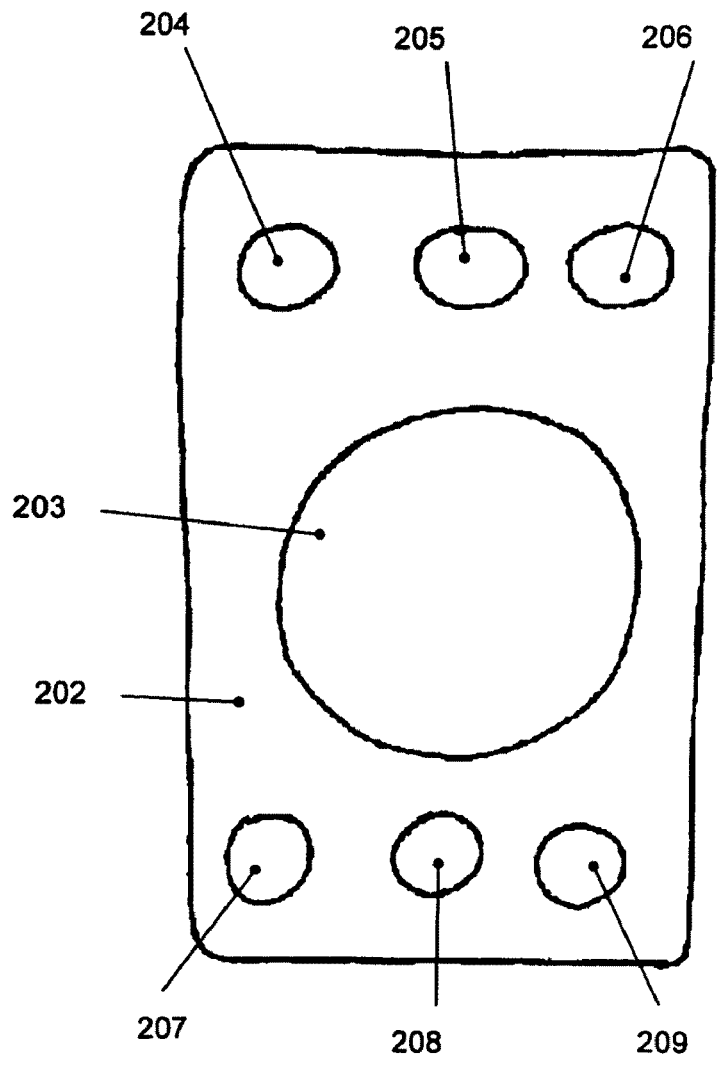 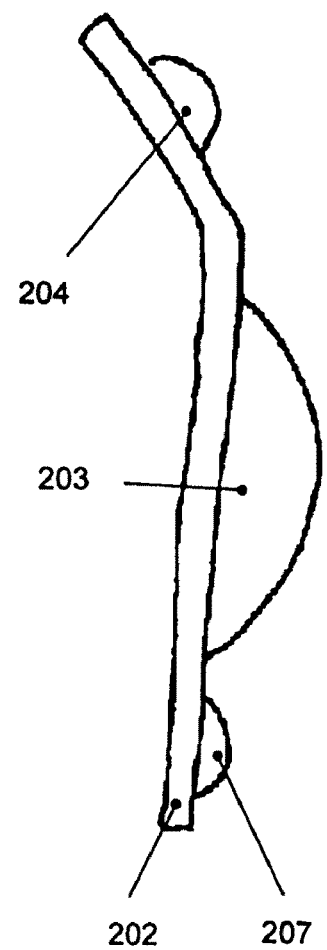
Fig. 8                    Fig. 9

VEHICLE HEADLIGHT HAVING PLURAL LIGHT SOURCES AND LENSES

FIELD OF THE INVENTION

The invention relates to a vehicle headlight, in particular a motor vehicle headlight, comprising a first light source and comprising at least a second light source.

BACKGROUND INFORMATION

DE 10 2004 053 303 A1 discloses a vehicle headlight for generating a light intensity distribution pattern for dipped-beam light by the emission of light from a plurality of luminaire subunits, each of which has a light source with a semiconductor light emitting element, wherein at least one of the luminaire subunits is configured as a luminaire subunit which emits in the forward direction and which sends light in the forward direction of a vehicle, and at least one luminaire subunit is configured as a laterally emitting luminaire subunit which sends light towards the outer side in the direction of the width of the vehicle at an angle relative to the forward direction, and wherein each laterally emitting luminaire subunit has a reflector provided with a reflective surface having a curved surface in the form of a parabolic column, and a focal line running in the horizontal direction, wherein the reflector diffusely forms light from the light source in the horizontal direction.

DE 10 2004 053 320 A1 discloses a vehicle headlight having a main luminaire body, a base luminaire subunit, which is formed in such a way that it emits light for forming a light intensity distribution pattern for dipped-beam light, and an additional luminaire subunit, which is formed in such a way that it emits light for forming an additional light intensity distribution pattern by virtue of the fact that it temporarily shines into the main luminaire body, wherein a light source lamp is used as light source of the base luminaire subunit, and a semiconductor light emitting element is used as light source of the additional luminaire subunit.

Further vehicle headlights are disclosed in DE-10-2004 060 840 A1, DE 10 2004 061 873 A1, DE 198 14 480 A1, DE 100 27 981 A1, DE 195 39 422 C2 and DE-10-2004 062 286 A1.

DE 198 14 480 A1 discloses a headlight for vehicles according to the projection principle comprising a reflector, a light source, a lens through which passes light which is emitted by the light source and reflected by the reflector, and comprising at least one at least partly light-transmissive element which surrounds the lens at least on part of its periphery and which has optical profiles at least in regions and through which light which is emitted by the light source and cannot be picked up by the reflector passes and is collected, wherein the light which has been reflected by the reflector and has passed through the lens has an upper bright-dark boundary, and wherein the headlight has at least one additional light source for generating a side light which is arranged in such a way that light emitted by it at least partly passes through the element.

DE 100 27 981 A1 discloses a headlight with integrated parking light, comprising a housing, at least one light source and a light disc as termination of the headlight towards the outside, wherein the light disc is subdivided into a plurality of segments, wherein at least one segment is arranged opposite the light source for the parking light function and said one segment opposite the light source for the parking light function has an integrated optical system.

A vehicle luminaire disclosed in DE 103 61 303 A1 has a first luminous means for a first light function, a reflector for concentrating the light emitted by an emission location of the first luminous means, at least a second luminous means displaced upstream of the first luminous means for a second light function, and a back-reflector arranged between the first luminous means and the second luminous means. The reflector has a first prism structure having a first prism surface and second prism surface. In this case, the first prism surfaces are arranged for deflecting the light impinging directly on them from the emission location to the light disc.

It is an object of the invention to specify an improved vehicle headlight. It is a further object of the invention to lower the costs for the production of vehicle headlights.

SUMMARY OF THE INVENTION

The aforementioned object is achieved by means of a vehicle headlight or vehicle front headlight, in particular motor vehicle headlight or motor vehicle front headlight, comprising a first light source, comprising at least a second light source and comprising a transparent shaped part configured in one piece, wherein the shaped part comprises a first optical structure for the direction of light emitted by the first light source and at least a second optical structure for the direction of light emitted by the second light source, and wherein the first optical structure and the second optical structure each comprise a continuously curved surface or a continuous, curved surface each having an extent of at least half a centimeter, in particular one centimeter, in two orthogonal directions. A surface has an extent of at least a minimum longitudinal extent in two orthogonal directions in particular when the surface comprises or completely covers at least one circle having a diameter corresponding to the minimum longitudinal extent. A first optical structure within the meaning of the invention is in particular a light-concentrating structure. A continuous surface within the meaning of the invention is in particular a continuously derivable surface. A continuous surface within the meaning of the invention has in particular no jumps within the aforementioned minimum extent.

In a further configuration of the invention, the first light source in conjunction with the first optical structure, and also if appropriate further elements, such as e.g. a reflector, forms a dipped-beam light, a full-beam light and/or a fog light.

In one configuration of the invention, the first light source in conjunction with the first optical structure directs light in a different direction from the second light source in conjunction with the second optical structure.

In a further configuration of the invention, the first light source comprises a lamp, in particular a gas discharge lamp or an incandescent lamp, or is configured as a lamp, in particular a gas discharge lamp or an incandescent lamp. The first light source may be e.g. a halogen lamp or a xenon luminaire. Suitable configurations for the first light source can be gathered e.g. from pages 739 to 753 of the book "Bosch, Kraftfahrtechnisches Taschenbuch" ["Bosch, Automotive Technology Handbook"], 23rd edition, Vieweg, 1999, ISBN 3-528-03876-4. However, it may also be provided that the first light source is an LED or an arrangement of LEDs. In this case, the LED or the arrangement of LEDs is configured in particular in such a way that it can be used to implement a dipped-beam light, a full-beam light and/or a fog light.

In a further configuration of the invention, the second light source is a semiconductor light emitting element, in particular an LED or light emitting diode, or comprises a semiconductor light emitting element, in particular an LED or light emitting diode. The use of LEDs for signal luminaires for motor vehicles is disclosed e.g. in DE 102 07 431 A1, DE 102 37 263 A1 and DE 195 07 234 B4.

In a further configuration of the invention, the vehicle headlight comprises at least a third light source, wherein the shaped part has at least a third optical structure for the direction of light emitted by the third light source. In a further configuration of the invention, the third light source is a semiconductor light emitting element, in particular an LED or light emitting diode, or comprises a semiconductor light emitting element, in particular an LED or light emitting diode.

In a further configuration of the invention, the first, the second and/or the third optical structure and/or a further optical structure is blank-pressed. In a further configuration of the invention, the shaped part is blank-pressed, in particular on both sides. Blank-pressing is to be understood within the meaning of the invention as, in particular, pressing a lens such that subsequent processing of an optically active surface of the lens after pressing can be obviated.

In a further configuration of the invention, the first optical structure is configured as a lens or as part of a lens. In a further configuration of the invention, the first optical structure is configured as a projection lens or as part of a projection lens. In a further configuration of the invention, the first optical structure is configured as a converging lens or as part of a converging lens. In a further configuration of the invention, an optically active surface of the first optical structure that is remote from the first light source is configured convexly or aspherically.

In a further configuration of the invention, the vehicle headlight comprises a light shield, wherein an edge of the light shield can be imaged as a bright-dark boundary by means of the first optical structure.

In a further configuration of the invention, the transparent shaped part substantially consists of glass or the transparent shaped part comprises glass.

In a further configuration of the invention, the transparent shaped part forms an outer part of the vehicle headlight. That is to say, in particular, that in a configuration of the invention no additional outer disc, such as, for instance, the transparent covering designated by reference symbol 30 in DE 10 2004 061 873 A1, is provided.

In a configuration it may be provided that an optical structure has substantially or virtually a roughness of less than 0.05 μm, in particular in the case of a light transmission at the surface of at least 90%. However, partial regions, in particular of the first optical structure, can have a greater roughness. Such partial regions having a greater roughness are configured in particular in accordance with DE 10 2004 011 084. Roughness within the meaning of the invention is to be defined in particular as $R_a$, in particular according to ISO 4287.

In a further configuration it may be provided that an emblem is embossed in particular on a surface of the transparent shaped part which faces the (first) light source. Said emblem is advantageously arranged on that surface of the transparent shaped part which faces the first light source. The aforementioned emblem is advantageously configured in accordance with an emblem disclosed in DE 10 2004 011 104.

In a configuration the emblem comprises a basic surface which is inclined relative to that surface of the transparent shaped part which faces the (first) light source or relative to an optical axis of the transparent shaped part (or e.g. the first optical structure) in such a way that light penetrating into the transparent shaped part through a surface remote from the (first) light source along or parallel to the optical axis of the transparent shaped part (or e.g. the first optical structure) is subjected to total reflection at the basic surface. In a configuration the emblem comprises a basic surface which is inclined relative to that surface of the transparent shaped part which faces the (first) light source by an angle of between 25° and 80°, in particular between 35° and 60°, or relative to an optical axis of the transparent shaped part (or e.g. the first optical structure) by an angle of between 10° and 65°, in particular between 30° and 55°.

It may be provided that, on that surface of the first optical structure which faces the first light source or on that surface of the transparent shaped part which faces the light source, in the region of the first optical structure, the arrangement comprises an, in particular blank-pressed, deformation or embossing for deflecting part of the light that can be generated by the first light source into a secondary luminous region outside a main luminous region of the first light source in conjunction with the first optical structure. The deformation or embossing may be configured in accordance with a deformation or embossing disclosed in DE 10 2004 024 107. As an alternative or in addition, by means of a further (e.g. the second) light source in conjunction with a further (e.g. the second) optical structure, light can be directed into said secondary luminous region. In a configuration, at least 95%, in particular at least 97%, of the light which can emerge or emerges from the first optical structure is allotted to the main luminous region. In a further configuration, less than 5%, in particular less than 3%, of the light which can emerge or emerges from the first optical structure, but advantageously at least 0.2%, in particular at least 0.5%, of the light which can emerge or emerges from the first optical structure is allotted to the secondary luminous region. By way of example, traffic signs can be illuminated or lit up by means of the secondary luminous region. Main luminous region and secondary luminous region should be regarded as separate if an unilluminated region lies between them. In said unilluminated region, the light intensity is virtually zero or negligibly small.

In a further configuration, substantially no light from the second light source passes through the first optical structure and substantially no light from the first light source passes through the second optical structure.

In a further configuration, the continuously curved or continuous, curved surface of the first optical structure comprises an extent of at least two centimeters, in particular of at least four centimeters, in two orthogonal directions. In a further configuration, the continuously curved or continuous, curved surface of the first optical structure and the continuously curved or continuous, curved surface of the second optical structure each comprise an extent of at least two centimeters, in particular of at least four centimeters, in two orthogonal directions.

The aforementioned object is additionally achieved by means of a transparent shaped part comprising one or more of the aforementioned features.

The aforementioned object is additionally achieved by means of a motor vehicle comprising a vehicle headlight or vehicle front headlight comprising one or more of the aforementioned features. In a configuration of the invention, in this case the bright-dark boundary can be imaged onto a roadway on which the motor vehicle can be arranged.

The aforementioned object is additionally achieved by means of a vehicle headlight or vehicle front headlight, in particular motor vehicle headlight or motor vehicle front headlight, comprising a first light source, comprising at least a second light source and comprising a transparent shaped part configured in one piece, wherein the shaped part comprises a first convex lens for the direction of light emitted by the first light source and at least a second convex or concave lens for the direction of light emitted by the second light source, and wherein the substantial part of the light which is emitted by the first light source and passes through the transparent shaped part emerges from the first convex lens. A convex lens in this sense is in particular a lens having at least one convex surface. A convex lens in this sense is in particular a lens having two convex surfaces, a lens having one convex surface and having one concave surface or a lens having one convex surface and having one plane surface. If a convex lens in this sense comprises a lens having one convex surface and having one concave surface, these surfaces are configured in particular in such a way that the convex lens is configured in light-concentrating fashion.

Within the meaning of the invention, the substantial part of the light which is emitted by a light source and passes through the transparent shaped part is intended to be or comprise in particular substantially all of the light reduced by scattered light.

In a configuration of the invention, the substantial part of the light which is emitted by the second light source and passes through the transparent shaped part emerges from the second convex or concave lens.

In a further configuration of the invention, the first convex lens and the second convex or concave lens each comprise an extent of at least one centimeter in two orthogonal directions.

In a further configuration of the invention, the first light source in conjunction with the first convex lens, and also if appropriate further elements, such as e.g. a reflector, forms a dipped-beam light, a full-beam light and/or a fog light.

In one configuration of the invention, the first light source in conjunction with the first convex lens directs light in a different direction from the second light source in conjunction with the second convex or concave lens.

In a further configuration of the invention, the first light source comprises a lamp, in particular a gas discharge lamp or an incandescent lamp, or is configured as a lamp, in particular a gas discharge lamp or an incandescent lamp. The first light source may be e.g. a halogen lamp or a xenon luminaire. Suitable configurations for the first light source can be gathered e.g. from pages 739 to 753 of the book "Bosch, Kraftfahrtechnisches Taschenbuch" ["Bosch, Automotive Technology Handbook"], 23rd edition, Vieweg, 1999, ISBN 3-528-03876-4. However, it may also be provided that the first light source is an LED or an arrangement of LEDs. In this case, the LED or the arrangement of LEDs is configured in particular in such a way that it can be used to implement a dipped-beam light, a full-beam light and/or a fog light.

In a further configuration of the invention, the second light source is a semiconductor light emitting element, in particular an LED or light emitting diode, or comprises a semiconductor light emitting element, in particular an LED or light emitting diode. The use of LEDs for signal luminaires for motor vehicles is disclosed e.g. in DE 102 07 431 A1, DE 102 37 263 A1 and DE 195 07 234 B4.

In a further configuration of the invention, the vehicle headlight comprises at least a third light source, wherein the shaped part has at least a third convex or concave lens for the direction of light emitted by the third light source. In a further configuration of the invention, the third light source is a semiconductor light emitting element, in particular an LED or light emitting diode, or comprises a semiconductor light emitting element, in particular an LED or light emitting diode.

In a further configuration of the invention, the first, second and/or the third convex or concave lens and/or a further convex or concave lens is blank-pressed. In a further configuration of the invention, the shaped part is blank-pressed, in particular on both sides. Blank-pressing is to be understood within the meaning of the invention as, in particular, moulding a lens such that subsequent processing of an optically active surface of the lens after pressing can be obviated.

In a further configuration of the invention, the first convex lens is configured as a lens or as part of a lens. In a further configuration of the invention, the first convex lens is configured as a projection lens or as part of a projection lens. In a further configuration of the invention, an optically active surface of the first convex lens that is remote from the first light source is configured aspherically.

In a further configuration of the invention, the vehicle headlight comprises a light shield, wherein an edge of the light shield can be imaged as a bright-dark boundary by means of the first convex lens.

In a further configuration of the invention, the transparent shaped part substantially consists of glass or the transparent shaped part comprises glass.

In a further configuration of the invention, the transparent shaped part forms an outer part of the vehicle headlight. That is to say, in particular, that in a configuration of the invention no additional outer disc, such as, for instance, the transparent covering designated by reference symbol 30 in DE 10 2004 061 873 A1, is provided.

In a configuration it may be provided that a convex lens has substantially or virtually a roughness of less than 0.05 µm, in particular in the case of a light transmission at the surface of at least 90%. However, partial regions, in particular of the first convex lens, can have a greater roughness. Such partial regions having a greater roughness are configured in particular in accordance with DE 10 2004 011 084. Roughness within the meaning of the invention is to be defined in particular as $R_a$, in particular according to ISO 4287.

In a further configuration it may be provided that an emblem is embossed in particular on a surface of the transparent shaped part which faces the (first) light source. Said emblem is advantageously arranged on that surface of the transparent shaped part which faces the first light source. The aforementioned emblem is advantageously configured in accordance with an emblem disclosed in DE 10 2004 011 104.

In a configuration the emblem comprises a basic surface which is inclined relative to that surface of the transparent shaped part which faces the (first) light source or relative to an optical axis of the transparent shaped part (or e.g. the first convex lens) in such a way that light penetrating into the transparent shaped part through a surface remote from the (first) light source along or parallel to the optical axis of the transparent shaped part (or e.g. the first convex lens) is subjected to total reflection at the basic surface. In a configuration the emblem comprises a basic surface which is inclined relative to that surface of the transparent shaped part which faces the (first) light source by an angle of between 25° and 80°, in particular between 35° and 60°, or relative to an optical axis of the transparent shaped part (or e.g. the first convex lens) by an angle of between 10° and 65°, in particular between 30° and 55°.

It may be provided that, on that surface of the first convex lens which faces the first light source or on that surface of the transparent shaped part which faces the light source, in the region of the first convex lens, the arrangement comprises an, in particular blank-pressed, deformation or embossing for deflecting part of the light that can be generated by the first light source into a secondary luminous region outside a main luminous region of the first light source in conjunction with the first convex lens. The deformation or embossing may be configured in accordance with a deformation or embossing disclosed in DE 10 2004 024 107. As an alternative or in addition, by means of a further (e.g. the second) light source in conjunction with a further (e.g. the second) convex lens, light can be directed into said secondary luminous region. In a configuration, at least 95%, in particular at least 97%, of the light which can emerge or emerges from the first convex lens is allotted to the main luminous region. In a further configuration, less than 5%, in particular less than 3%, of the light which can emerge or emerges from the first convex lens, but advantageously at least 0.2%, in particular at least 0.5%, of the light which can emerge or emerges from the first convex lens is allotted to the secondary luminous region. By way of example, traffic signs can be illuminated or lit up by means of the secondary luminous region. Main luminous region and secondary luminous region should be regarded as separate if an unilluminated region lies between them. In said unilluminated region, the light intensity is virtually zero or negligibly small.

The aforementioned object is additionally achieved by means of a transparent shaped part comprising one or more of the aforementioned features.

The aforementioned object is achieved by means of a vehicle headlight or vehicle front headlight, in particular motor vehicle headlight or motor vehicle front headlight, comprising a first light source, comprising at least a second light source, comprising a light shield and comprising a transparent shaped part configured in one piece, wherein the shaped part comprises a first optical structure for imaging an edge of the light shield as a bright-dark boundary with respect to the light emitted by the first light source and at least a second optical structure for the direction of light emitted by the second light source. An optical structure within the meaning of the invention is in particular at least one macrostructure, and not or not just a microstructure. In this case, such a microstructure is intended to be in particular a structure composed of small alterations on a surface, wherein the small alterations on a surface bring about a scattering of light. A macrostructure within the meaning of the invention has in particular an extent of at least half a centimeter.

In a further configuration of the invention, the first light source in conjunction with the first optical structure is part of a dipped-beam light.

In one configuration of the invention, the first light source in conjunction with the first optical structure directs light in a different direction from the second light source in conjunction with the second optical structure.

In a further configuration of the invention, the first light source comprises a lamp, in particular a gas discharge lamp or an incandescent lamp, or is configured as a lamp, in particular a gas discharge lamp or an incandescent lamp. The first light source may be e.g. a halogen lamp or a xenon luminaire. Suitable configurations for the first light source can be gathered e.g. from pages 739 to 753 of the book "Bosch, Kraftfahrtechnisches Taschenbuch" ["Bosch, Automotive Technology Handbook"], 23rd edition, Vieweg, 1999, ISBN 3-528-03876-4. However, it may also be provided that the first light source is an LED or an arrangement of LEDs. In this case, the LED or the arrangement of LEDs is configured in particular in such a way that it can be used to implement a dipped-beam light, a full-beam light and/or a fog light.

In a further configuration of the invention, the second light source is a semiconductor light emitting element, in particular an LED or light emitting diode, or comprises a semiconductor light emitting element, in particular an LED or light emitting diode. The use of LEDs for signal luminaires for motor vehicles is disclosed e.g. in DE 102 07 431 A1, DE 102 37 263 A1 and DE 195 07 234 B4.

In a further configuration of the invention, the vehicle headlight comprises at least a third light source, wherein the shaped part has at least a third optical structure for the direction of light emitted by the third light source. In a further configuration of the invention, the third light source is a semiconductor light emitting element, in particular an LED or light emitting diode, or comprises a semiconductor light emitting element, in particular an LED or light emitting diode.

In a further configuration of the invention, the first, the second and/or the third optical structure and/or a further optical structure is blank-pressed. In a further configuration of the invention, the shaped part is blank-pressed, in particular on both sides. Blank-pressing is to be understood within the meaning of the invention as, in particular, pressing a lens such that subsequent processing of an optically active surface of the lens after pressing can be obviated.

In a further configuration of the invention, the first optical structure is configured as a lens or as part of a lens. In a further configuration of the invention, the first optical structure is configured as a projection lens or as part of a projection lens. In a further configuration of the invention, the first optical structure is configured as a converging lens or as part of a converging lens. In a further configuration of the invention, an optically active surface of the first optical structure that is remote from the first light source is configured convexly or aspherically.

In a further configuration of the invention, the transparent shaped part substantially consists of glass or the transparent shaped part comprises glass.

In a further configuration of the invention, the transparent shaped part forms an outer part of the vehicle headlight. That is to say, in particular, that in a configuration of the invention no additional outer disc, such as, for instance, the transparent covering designated by reference symbol 30 in DE 10 2004 061 873 A1, is provided.

In a configuration it may be provided that an optical structure has substantially or virtually a roughness of less than 0.05 μm, in particular in the case of a light transmission at the surface of at least 90%. However, partial regions, in particular of the first optical structure, can have a greater roughness. Such partial regions having a greater roughness are configured in particular in accordance with DE 10 2004 011 084. Roughness within the meaning of the invention is to be defined in particular as $R_a$, in particular according to ISO 4287.

In a further configuration it may be provided that an emblem is embossed in particular on a surface of the transparent shaped part which faces the (first) light source. Said emblem is advantageously arranged on that surface of the transparent shaped part which faces the first light source. The aforementioned emblem is advantageously configured in accordance with an emblem disclosed in DE 10 2004 011 104.

In a configuration the emblem comprises a basic surface which is inclined relative to that surface of the transparent shaped part which faces the (first) light source or relative to an optical axis of the transparent shaped part (or e.g. the first optical structure) in such a way that light penetrating into the transparent shaped part through a surface remote from the (first) light source along or parallel to the optical axis of the transparent shaped part (or e.g. the first optical structure) is subjected to total reflection at the basic surface. In a configuration the emblem comprises a basic surface which is inclined relative to that surface of the transparent shaped part which faces the (first) light source by an angle of between 25° and 80°, in particular between 35° and 60°, or relative to an optical axis of the transparent shaped part (or e.g. the first optical structure) by an angle of between 10° and 65°, in particular between 30° and 55°.

It may be provided that, on that surface of the first optical structure which faces the first light source or on that surface of the transparent shaped part which faces the light source, in the region of the first optical structure, the arrangement comprises an, in particular blank-pressed, deformation or embossing for deflecting part of the light that can be generated by the first light source into a secondary luminous region outside a main luminous region of the first light source in conjunction with the first optical structure.

The deformation or embossing may be configured in accordance with a deformation or embossing disclosed in DE 10 2004 024 107. As an alternative or in addition, by means of a further (e.g. the second) light source in conjunction with a further (e.g. the second) optical structure, light can be directed into said secondary luminous region. In a configuration, at least 95%, in particular at least 97%, of the light which can emerge or emerges from the first optical structure is allotted to the main luminous region. In a further configuration, less than 5%, in particular less than 3%, of the light which can emerge or emerges from the first optical structure, but advantageously at least 0.2%, in particular at least 0.5%, of the light which can emerge or emerges from the first optical structure is allotted to the secondary luminous region. By way of example, traffic signs can be illuminated or lit up by means of the secondary luminous region. Main luminous region and secondary luminous region should be regarded as separate if an unilluminated region lies between them. In said unilluminated region, the light intensity is virtually zero or negligibly small.

The aforementioned object is additionally achieved by means of a vehicle headlight or vehicle front headlight, in particular motor vehicle headlight or motor vehicle front headlight, comprising a first light source, comprising at least a second light source and comprising a transparent shaped part configured in one piece, wherein the shaped part comprises a first, light-concentrating, optical structure for the direction of light emitted by the first light source and at least a second optical structure for the direction of light emitted by the second light source. A first optical structure within the meaning of the invention is in particular a structure.

An optical structure, in particular first optical structure, within the meaning of the invention is in particular at least one macrostructure, and not or not just a microstructure. In this case, such a microstructure is intended to be in particular a structure composed of small alterations on a surface, wherein the small alterations on a surface bring about a scattering of light. A macrostructure within the meaning of the invention has in particular an extent of at least half a centimeter.

In a further configuration of the invention, the first light source in conjunction with the first optical structure, and also if appropriate further elements, such as e.g. a reflector, forms a dipped-beam light, a full-beam light and/or a fog light.

In one configuration of the invention, the first light source in conjunction with the first optical structure directs light in a different direction from the second light source in conjunction with the second optical structure.

In a further configuration of the invention, the first light source comprises a lamp, in particular a gas discharge lamp or an incandescent lamp, or is configured as a lamp, in particular a gas discharge lamp or an incandescent lamp. The first light source may be e.g. a halogen lamp or a xenon luminaire. Suitable configurations for the first light source can be gathered e.g. from pages 739 to 753 of the book "Bosch, Kraftfahrtechnisches Taschenbuch" ["Bosch, Automotive Technology Handbook"], 23rd edition, Vieweg, 1999, ISBN 3-528-03876-4. However, it may also be provided that the first light source is an LED or an arrangement of LEDs. In this case, the LED or the arrangement of LEDs is configured in particular in such a way that it can be used to implement a dipped-beam light, a full-beam light and/or a fog light.

In a further configuration of the invention, the second light source is a semiconductor light emitting element, in particular an LED or light emitting diode, or comprises a semiconductor light emitting element, in particular an LED or light emitting diode. The use of LEDs for signal luminaires for motor vehicles is disclosed e.g. in DE 102 07 431 A1, DE 102 37 263 A1 and DE 195 07 234 B4.

In a further configuration of the invention, the vehicle headlight comprises at least a third light source, wherein the shaped part has at least a third optical structure for the direction of light emitted by the third light source. In a further configuration of the invention, the third light source is a semiconductor light emitting element, in particular an LED or light emitting diode, or comprises a semiconductor light emitting element, in particular an LED or light emitting diode.

In a further configuration of the invention, the first, the second and/or the third optical structure and/or a further optical structure is blank-pressed. In a further configuration of the invention, the shaped part is blank-pressed, in particular on both sides. Blank-pressing is to be understood within the meaning of the invention as, in particular, pressing a lens such that subsequent processing of an optically active surface of the lens after pressing can be obviated.

In a further configuration of the invention, the first optical structure is configured as a lens or as part of a lens. In a further configuration of the invention, the first optical structure is configured as a projection lens or as part of a projection lens. In a further configuration of the invention, the first optical structure is configured as a converging lens or as part of a converging lens. In a further configuration of the invention, an optically active surface of the first optical structure that is remote from the first light source is configured convexly or aspherically.

In a further configuration of the invention, the vehicle headlight comprises a light shield, wherein an edge of the light shield can be imaged as a bright-dark boundary by means of the first optical structure.

In a further configuration of the invention, the transparent shaped part substantially consists of glass or the transparent shaped part comprises glass.

In a further configuration of the invention, the transparent shaped part forms an outer part of the vehicle headlight. That is to say, in particular, that in a configuration of the invention no additional outer disc, such as, for instance, the transparent covering designated by reference symbol 30 in DE 10 2004 061 873 A1, is provided.

In a configuration it may be provided that an optical structure has substantially or virtually a roughness of less than 0.05 μm, in particular in the case of a light transmission at the surface of at least 90%. However, partial regions, in particular of the first optical structure, can have a greater roughness. Such partial regions having a greater roughness are configured in particular in accordance with DE 10 2004 011 084. Roughness within the meaning of the invention is to be defined in particular as $R_a$, in particular according to ISO 4287.

In a further configuration it may be provided that an emblem is embossed in particular on a surface of the transparent shaped part which faces the (first) light source. Said emblem is advantageously arranged on that surface of the transparent shaped part which faces the first light source. The aforementioned emblem is advantageously configured in accordance with an emblem disclosed in DE 10 2004 011 104.

In a configuration the emblem comprises a basic surface which is inclined relative to that surface of the transparent shaped part which faces the (first) light source or relative to an optical axis of the transparent shaped part (or e.g. the first optical structure) in such a way that light penetrating into the transparent shaped part through a surface remote from the (first) light source along or parallel to the optical axis of the transparent shaped part (or e.g. the first optical structure) is subjected to total reflection at the basic surface. In a configuration the emblem comprises a basic surface which is inclined relative to that surface of the transparent shaped part which faces the (first) light source by an angle of between 25° and 80°, in particular between 35° and 60°, or relative to an optical axis of the transparent shaped part (or e.g. the first optical structure) by an angle of between 10° and 65°, in particular between 30° and 55°.

It may be provided that, on that surface of the first optical structure which faces the first light source or on that surface of the transparent shaped part which faces the light source, in the region of the first optical structure, the arrangement comprises an, in particular blank-pressed, deformation or embossing for deflecting part of the light that can be generated by the first light source into a secondary luminous region outside a main luminous region of the first light source in conjunction with the first optical structure. The deformation or embossing may be configured in accordance with a deformation or embossing disclosed in DE 10 2004 024 107. As an alternative or in addition, by means of a further (e.g. the second) light source in conjunction with a further (e.g. the second) optical structure, light can be directed into said secondary luminous region. In an advantageous configuration, at least 95%, in particular at least 97%, of the light which can emerge or emerges from the first optical structure is allotted to the main luminous region. In a further configuration, less than 5%, in particular less than 3%, of the light which can emerge or emerges from the first optical structure, but advantageously at least 0.2%, in particular at least 0.5%, of the light which can emerge or emerges from the first optical structure is allotted to the secondary luminous region. By way of example, traffic signs can be illuminated or lit up by means of the secondary luminous region. Main luminous region and secondary luminous region should be regarded as separate if an unilluminated region lies between them. In said unilluminated region, the light intensity is virtually zero or negligibly small.

Motor vehicle within the meaning of the invention is in particular a land vehicle which can be used individually in traffic. Motor vehicles within the meaning of the invention are in particular not restricted to land vehicles having an internal combustion engine.

BRIEF DESCRIPTION OF THE DRAWINGS

FIG. 8 shows a further exemplary embodiment of a transparent shaped part;
FIG. 9 shows a side view of the transparent shaped part in accordance with FIG. 8.

DETAILED DESCRIPTION

Figure 1:
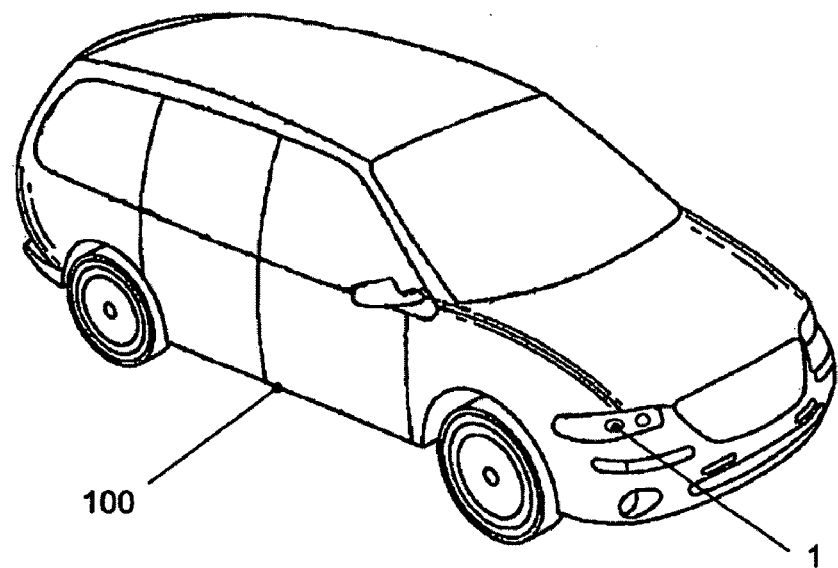
FIG. 1 shows a motor vehicle.
Figure 2:
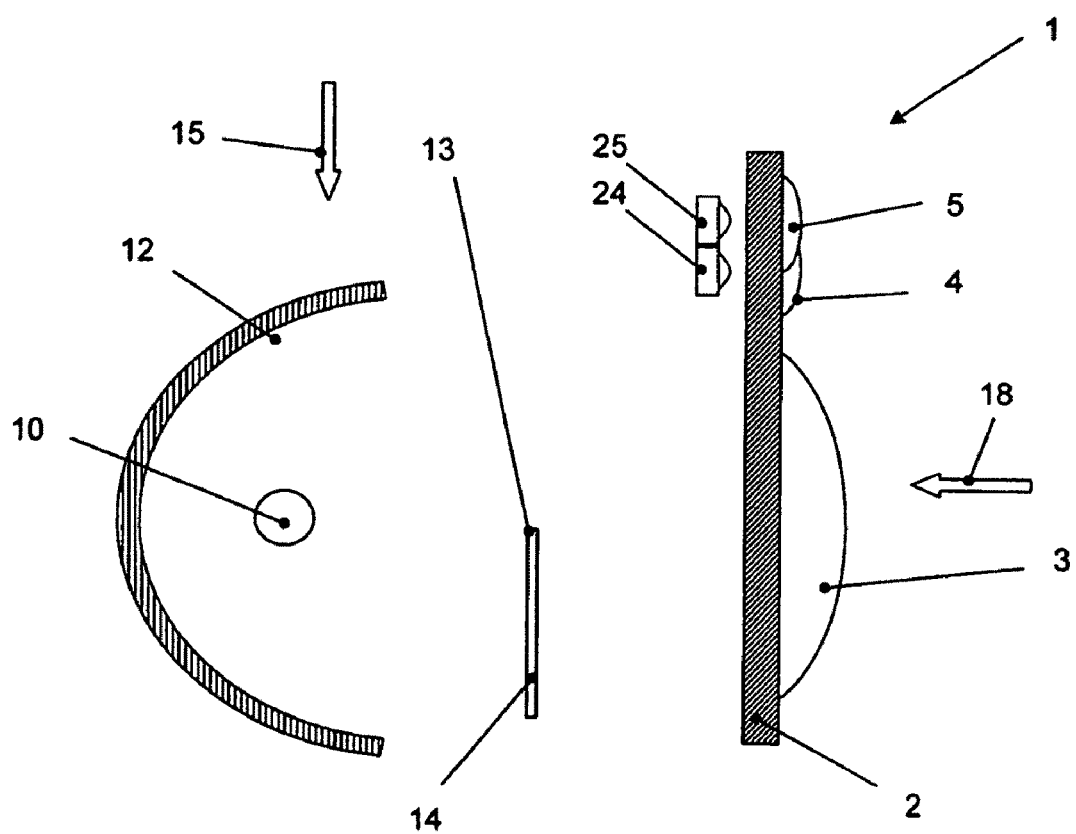
FIG. 2 shows a schematic illustration of an exemplary embodiment of a vehicle headlight in a cross section.
Figure 3:
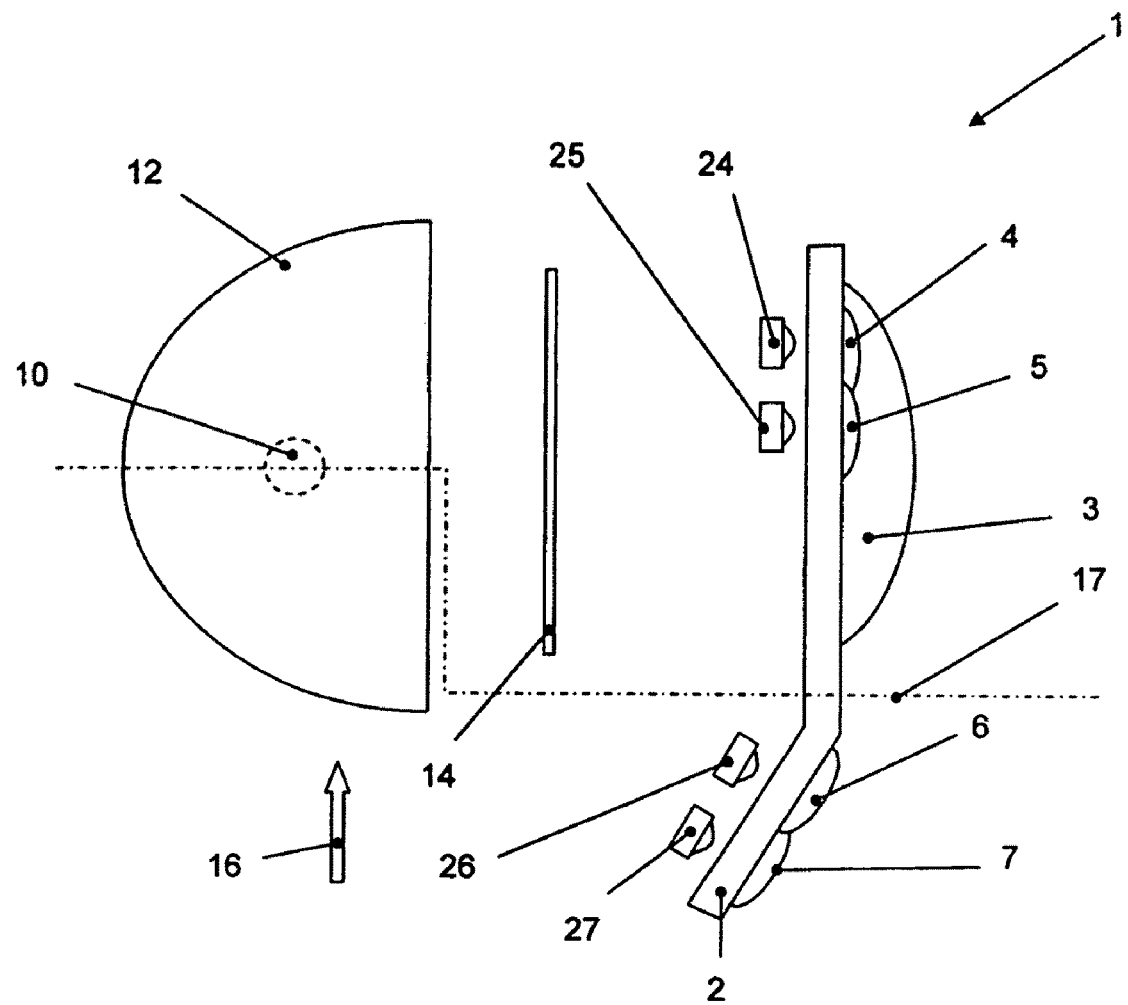
FIG. 3 shows a schematic illustration of the vehicle headlight in accordance with FIG. 2 in a plan view.
Figure 4:
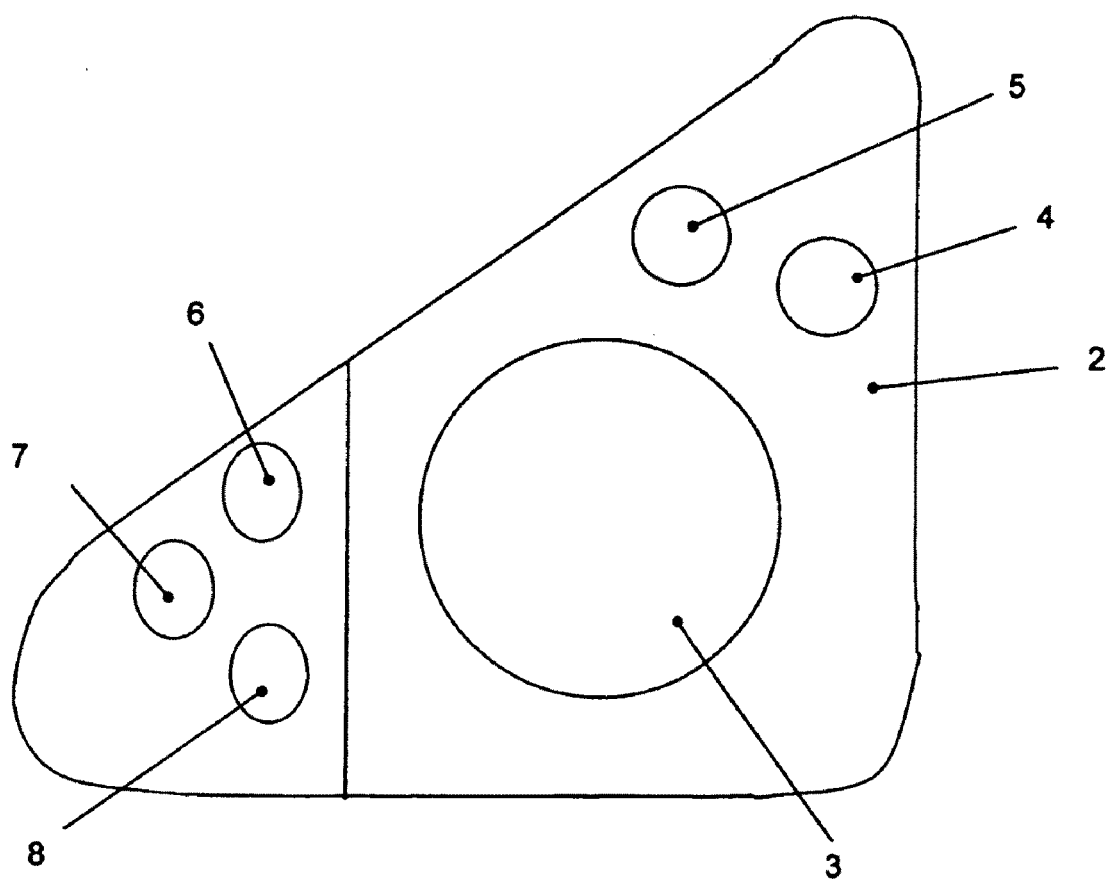
FIG. 4 shows an exemplary embodiment of a transparent shaped part.

FIG. 1 shows a motor vehicle 100 comprising a vehicle headlight 1 (front headlight), which is illustrated schematically in FIG. 2 in a cross section along a section line designated by reference symbol 17 in FIG. 3. In this case, FIG. 2 shows the vehicle headlight 1 from a viewing direction designated by reference symbol 16 in FIG. 3. FIG. 3 shows a schematic illustration of the vehicle headlight 1 from a viewing direction designated by reference symbol 15 in FIG. 2. The vehicle headlight 1 comprises a one-piece transparent shaped part 2 that is blank-pressed, in particular on both sides. FIG. 4 shows the transparent shaped part 2 from a viewing direction designated by reference symbol 18 in FIG. 2.

The vehicle headlight 1 additionally comprises a light source 10 for generating light, a reflector 12 for reflecting light that can be generated by means of the light source 10, and a light shield 14. The light source 10 is one exemplary embodiment of a first light source within the meaning of the claims. The light source 10 advantageously comprises a lamp, in particular a gas discharge lamp or an incandescent lamp, or is configured as a lamp, in particular a gas discharge lamp or an incandescent lamp. The first light source may be e.g. a halogen lamp or a xenon luminaire. Suitable configurations for the first light source can be gathered e.g. from pages 739 to 753 of the book "Bosch, Kraftfahrtechnisches Taschenbuch" ["Bosch, Automotive Technology Handbook"], 23rd edition, Vieweg, 1999, ISBN 3-528-03876-4.

Figure 5:
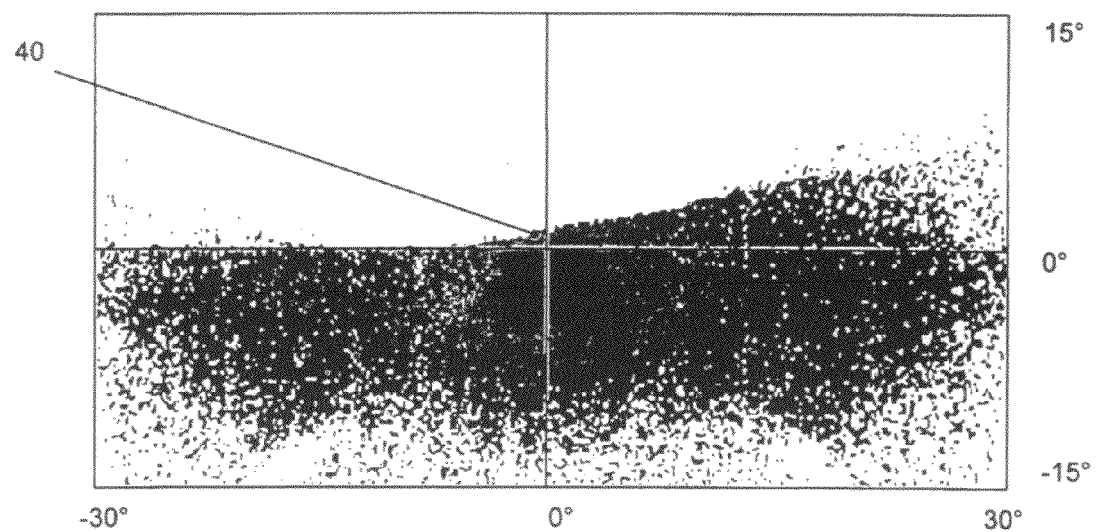
FIG. 5 shows a two-dimensional intensity distribution of light emitted by means of the vehicle headlight in accordance with FIG. 2.

The transparent shaped part 2 comprises an optical structure 3 for the direction of light emitted by the light source 10. In this case, the optically active surface of the optical structure 3 which is remote from the light source 10 is configured convexly or aspherically in such a way that an edge—designated by reference symbol 13 in FIG. 2—of the light shield 14—as illustrated in FIG. 5—can be imaged as a bright-dark boundary 40 by means of the optical structure 3. In this case, FIG. 5 shows a two-dimensional intensity distribution of light emitted by means of the vehicle headlight 1, wherein regions of very low or no light intensity are represented as white, regions of medium light intensity are represented as black and regions of high light intensity are represented as grey. The optical structure 3 is one exemplary embodiment of a first optical structure within the meaning of the claims.

In the vehicle headlight 1 illustrated, a dipped-beam light is implemented by means of the light source 10 in conjunction with the optical structure 3. A full-beam light or a fog light can also be implemented by means of the light source 10 in conjunction with the optical structure 3.

The transparent shaped part 2 additionally comprises an optical structure 4 for the direction of light emitted by a light source 24, an optical structure 5 for the direction of light emitted by a light source 25, an optical structure 6 for the direction of light emitted by a light source 26, an optical structure 7 for the direction of light emitted by a light source 27 and an optical structure 8 for the direction of light emitted by a light source that is not illustrated. The light sources 24, 25, 26 and 27 and also the light source interacting with the optical structure 8 are exemplary embodiments of a second or third light source within the meaning of the claims. The optical structures 4, 5, 6, 7 and 8 are exemplary embodiments of a second or third optical structure within the meaning of the claims. The light sources 24, 25, 26 and 27 and also the light source interacting with the optical structure are configured as semiconductor light emitting elements, in particular LEDs or light emitting diodes.

By means of the light sources 24, 25, 26 and 27 and also the light source interacting with the optical structure 8, in conjunction with the optical structures 4, 5, 6, 7 and/or 8, it is possible to implement a static cornering light, a fog light, part of a fog light, part of a dipped-beam light, a city light or daytime running light, a signal light, a headlight flasher, an infrared headlight and/or an indicator. In order to implement an infrared headlight, e.g. one (or a plurality) of the light sources 24, 25, 26 and 27 is configured as infrared light emitting diode. By means of the light sources 24, 25, 26 and 27 and also the light source interacting with the optical structure 8, in conjunction with the optical structures 4, 5, 6, 7 and/or 8, it is also possible to implement a specific corporate design.

In a configuration, the vehicle headlight 1 does not comprise an additional outer disc. Rather, the transparent shaped part 2 forms an outer part of the vehicle headlight 1.

It may be provided that, on that surface of the optical structure 3 which faces the light source 10 or on that surface of the transparent shaped part 2 which faces the light source 10, in the region of the optical structure 3, the arrangement comprises a deformation or embossing for deflecting part of the light that can be generated by the first light source 10 into a secondary luminous region outside a main luminous region generated by means of the light source 10 in conjunction with the optical structure 3. As an alternative or in addition, by means of the light source 5 in conjunction with the optical structure 25, light can be directed into the aforementioned secondary luminous region. In a configuration, at least 95%, in particular at least 97%, of the light which can emerge or emerges from the first optical structure is allotted to the main luminous region. In a further configuration, less than 5%, in particular less than 3%, of the light which can emerge or emerges from the first optical structure, but advantageously at least 0.2%, in particular at least 0.5%, of the light which can emerge or emerges from the first optical structure is allotted to the secondary luminous region. By way of example, traffic signs can be illuminated or lit up by means of the secondary luminous region. Main luminous region and secondary luminous region should be regarded as separate if an unilluminated region lies between them. In said unilluminated region, the light intensity is virtually zero or negligibly small.

Figure 6:
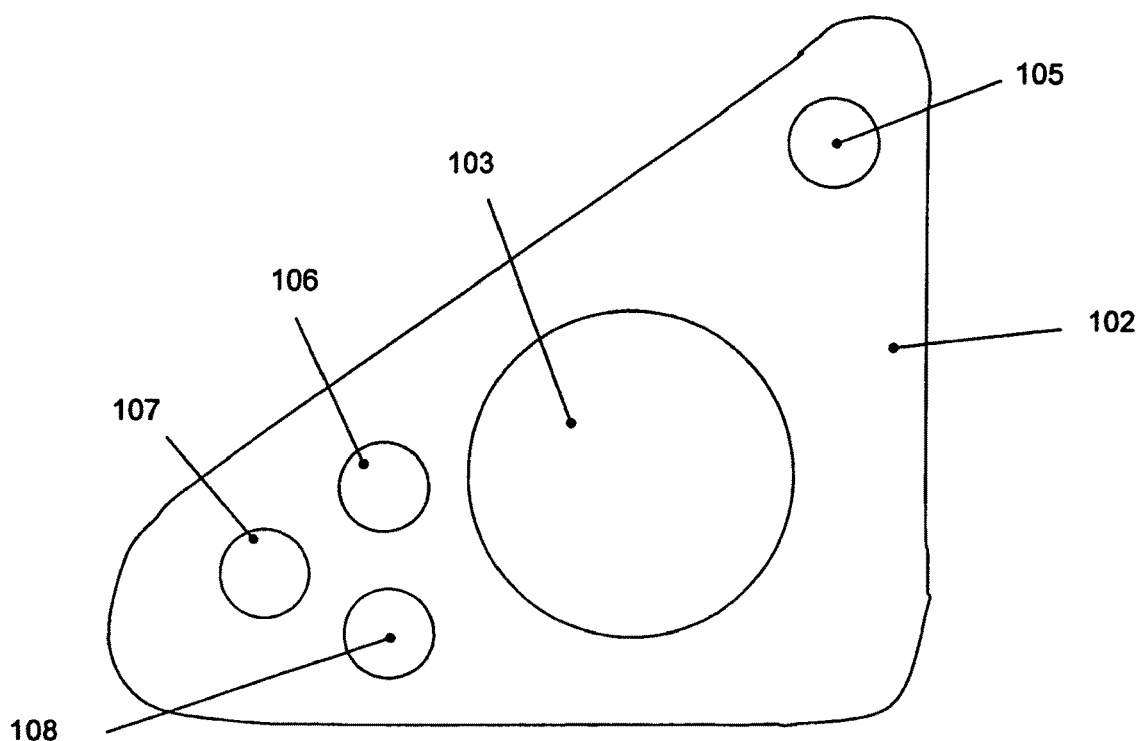
FIG. 6 shows a further exemplary embodiment of a transparent shaped part.
Figure 7:
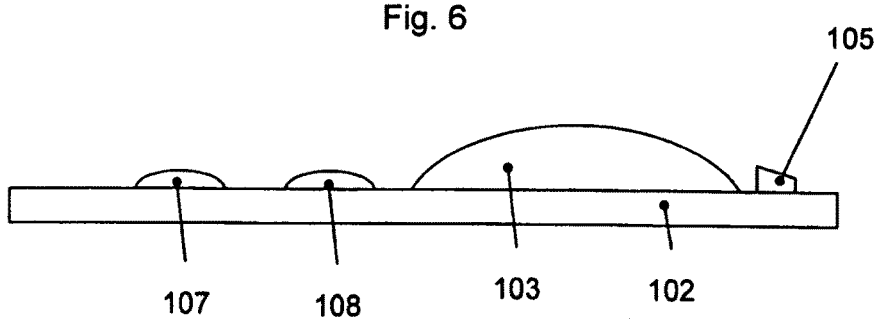
FIG. 7 shows a side view of the transparent shaped part in accordance with FIG. 6.

FIG. 6 and FIG. 7 show a further exemplary embodiment of a transparent shaped part 102 that is blank-pressed in one piece, wherein FIG. 7 shows the transparent shaped part 102 in a side view. The transparent shaped part 102 comprises an optical structure 103 corresponding to the optical structure 3. The transparent shaped part 102 additionally comprises e.g. optical structures 105, 106, 107 and 108 corresponding to one or more of the optical structures 4, 5, 6, 7 and 8.

FIG. 8 and FIG. 9 show a further exemplary embodiment of a transparent shaped part 202 that is blank-pressed in one piece, wherein FIG. 9 shows the transparent shaped part 202 in a side view. The transparent shaped part 202 comprises an optical structure 203 corresponding to the optical structure 3. The transparent shaped part 202 additionally comprises e.g. optical structures 204, 205, 206, 207, 208 and 209 corresponding to one or more of the optical structures 4, 5, 6, 7 and 8.

Figure 10:
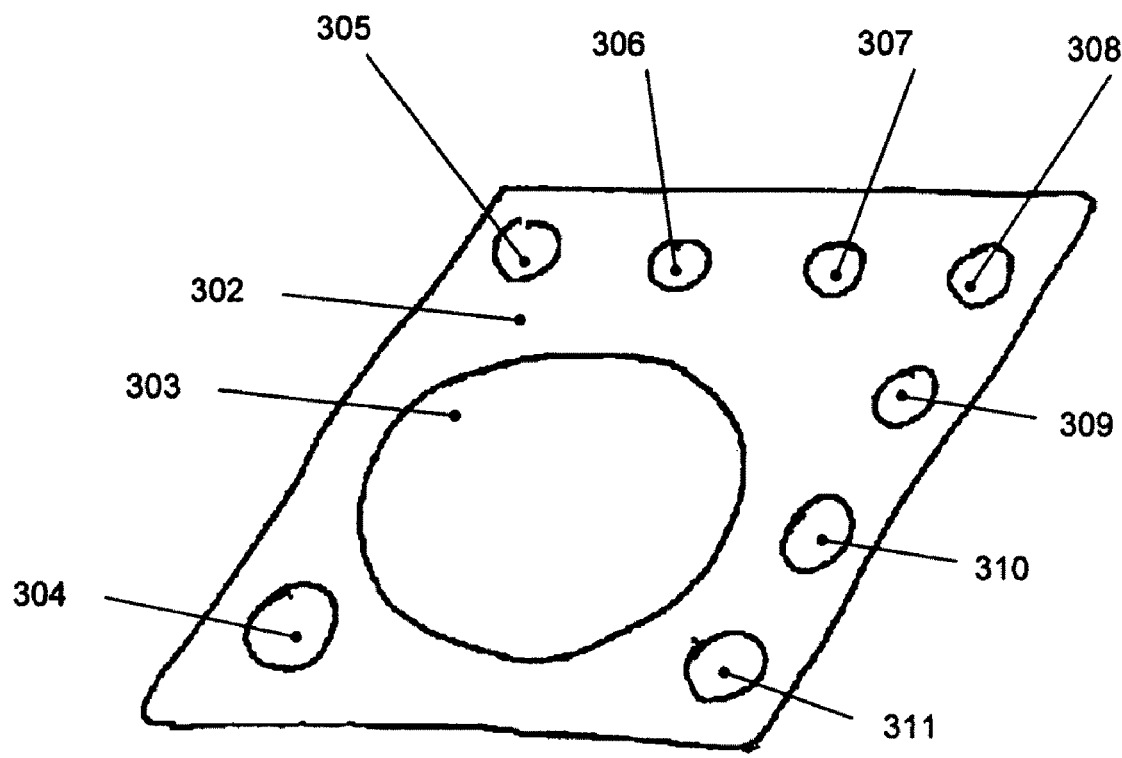
FIG. 10 shows a further exemplary embodiment of a transparent shaped part.
Figure 11:
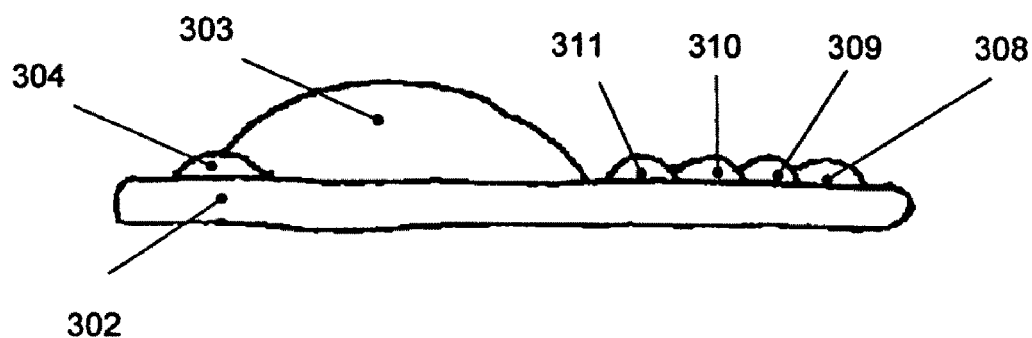
FIG. 11 shows a side view of the transparent shaped part in accordance with FIG. 10.

FIG. 10 and FIG. 11 show a further exemplary embodiment of a transparent shaped part 302 that is blank-pressed in one piece, wherein FIG. 7 shows the transparent shaped part 302 in a side view. The transparent shaped part 302 comprises an optical structure 303 corresponding to the optical structure 3. The transparent shaped part 302 additionally comprises e.g. optical structures 304, 305, 306, 307, 308, 309, 310 and 311 corresponding to one or more of the optical structures 4, 5, 6, 7 and 8.

In the exemplary embodiments illustrated, the transparent shaped parts 2, 102, 202 and 302 each comprise only one optical structure 3, 103, 203 and 303, respectively, corresponding to an optical structure for implementing a fog light, a dipped-beam light or a full-beam light. However, it is also possible to provide two or more of said optical structures on a transparent shaped part 2, 102, 202 and 302.

Figure 12:
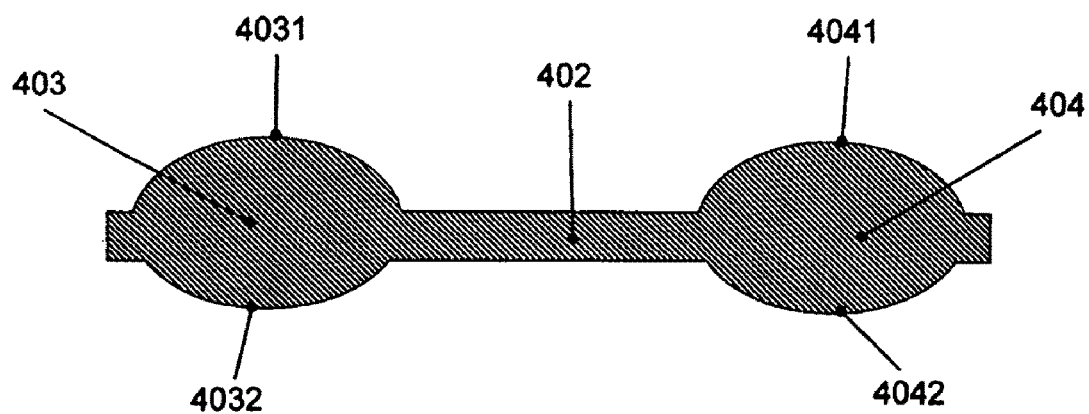
FIG. 12 shows a cross section through a further exemplary embodiment of a transparent shaped part in a basic illustration.

FIG. 12 shows a cross section through a further exemplary embodiment of a transparent shaped part 402 in a basic illustration. The transparent shaped part 402 comprises two optical structures 403 and 404, at least one of which in one configuration corresponds to the optical structure 3 with regard to its function. On its side remote from a light source and also on its side facing a light source, the optical structure 403 comprises a convex, in particular aspherical, curvature 4031 and 4032, respectively. On its side remote from a light source and also on its side facing a light source, the optical structure 404 likewise comprises a convex, in particular aspherical, curvature 4041 and 4042, respectively.

Figure 13:
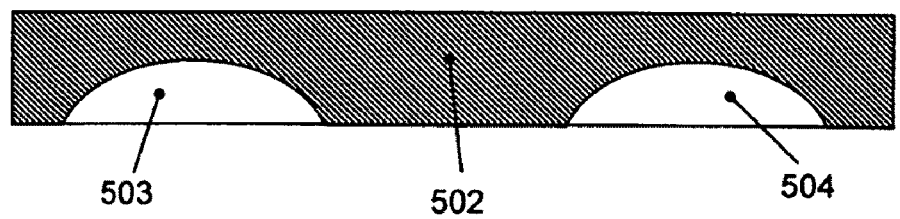
FIG. 13 shows a cross section through a further exemplary embodiment of a transparent shaped part in a basic illustration.

FIG. 13 shows a cross section through a further exemplary embodiment of a transparent shaped part 502 in a basic illustration. On its side facing light sources, the transparent shaped part 502 comprises two optical structures 503 and 504 configured as concave depressions.

Figure 14:
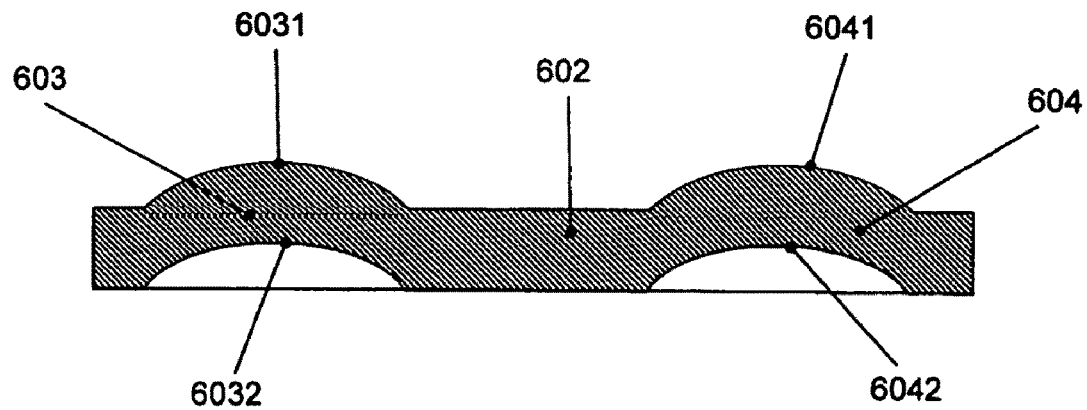
FIG. 14 shows a cross section through a further exemplary embodiment of a transparent shaped part in a basic illustration.

FIG. 14 shows a cross section through a further exemplary embodiment of a transparent shaped part 602 in a basic illustration. The transparent shaped part 602 comprises two optical structures 603 and 604, at least one of which in one configuration corresponds to the optical structure 3 with regard to its function. The optical structure 603 comprises a convex, in particular aspherical, curvature 6031 on its side remote from a light source and a concave curvature 6032 on its side facing a light source. The curvatures 6031 and 6032 are coordinated with one another in such a way that the optical structure 603 is a converging lens. The optical structure 604 comprises a convex, in particular aspherical, curvature 6041 on its side remote from a light source and a concave curvature 6042 on its side facing a light source. The curvatures 6041 and 6042 are coordinated with one another in such a way that the optical structure 604 is likewise a converging lens. The optical structures 403, 404, 503, 504, 603 and 604 can also be used in mixed fashion in a transparent shaped part.

Figure 15:
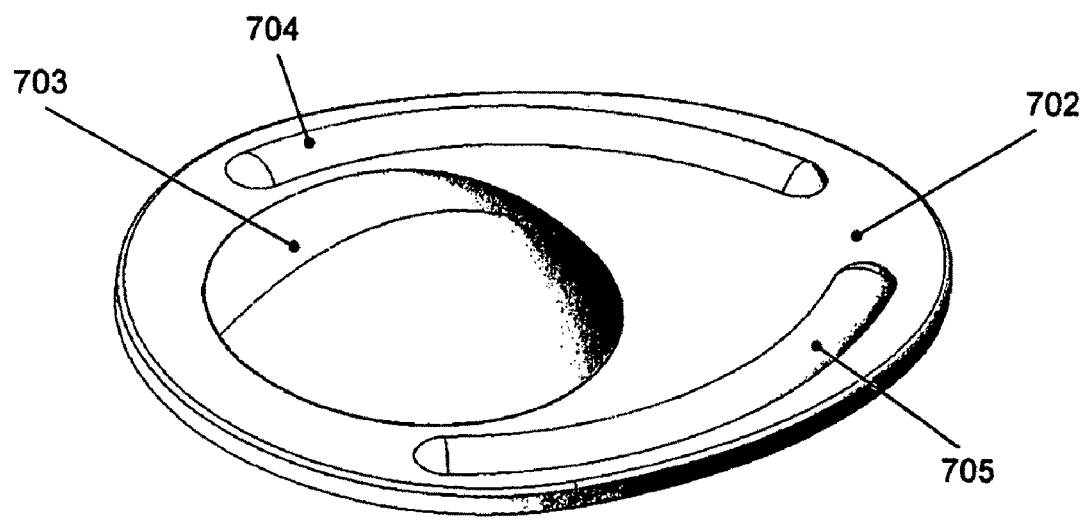
FIG. 15 shows a further exemplary embodiment of a transparent shaped part in a perspective illustration.
Figure 16:
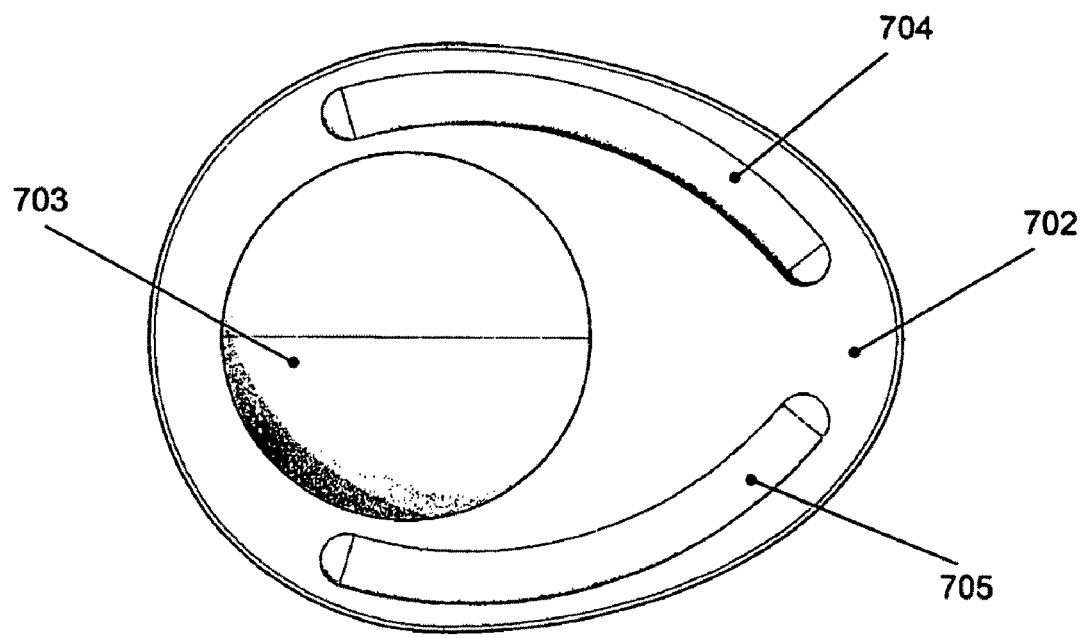
FIG. 16 shows a plan view of the transparent shaped part in accordance with FIG. 15.
Figure 17:
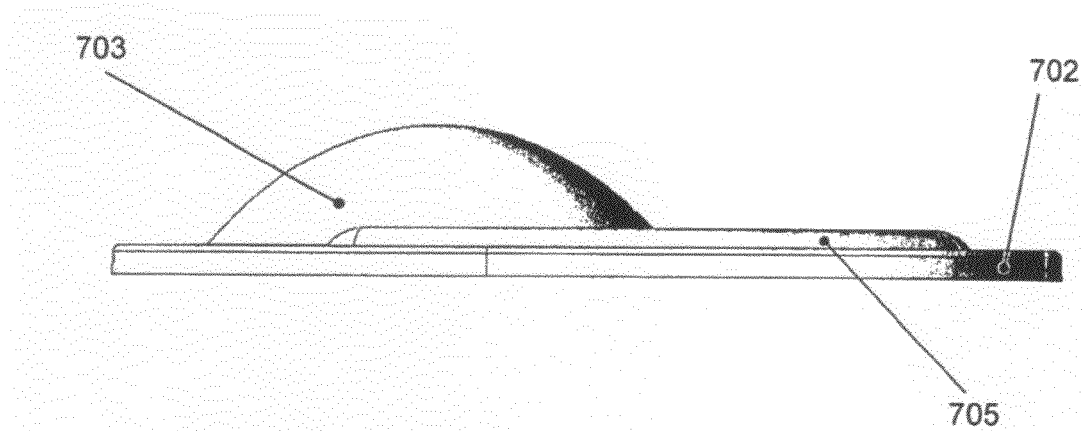
FIG. 17 shows a side view of the transparent shaped part in accordance with FIG. 15.

FIG. 15 shows a further exemplary embodiment of a transparent shaped part 702 in a perspective illustration, FIG. 16 shows a plan view of the transparent shaped part 702, and FIG. 17 shows a side view of the transparent shaped part 702. The transparent shaped part 702 comprises an optical structure 703 that corresponds to the optical structure 3. The transparent shaped part 702 additionally comprises two optical structures 704 and 705 corresponding—with regard to their function—e.g. to one or more of the optical structures 4, 5, 6, 7 and 8.

Figure 18:
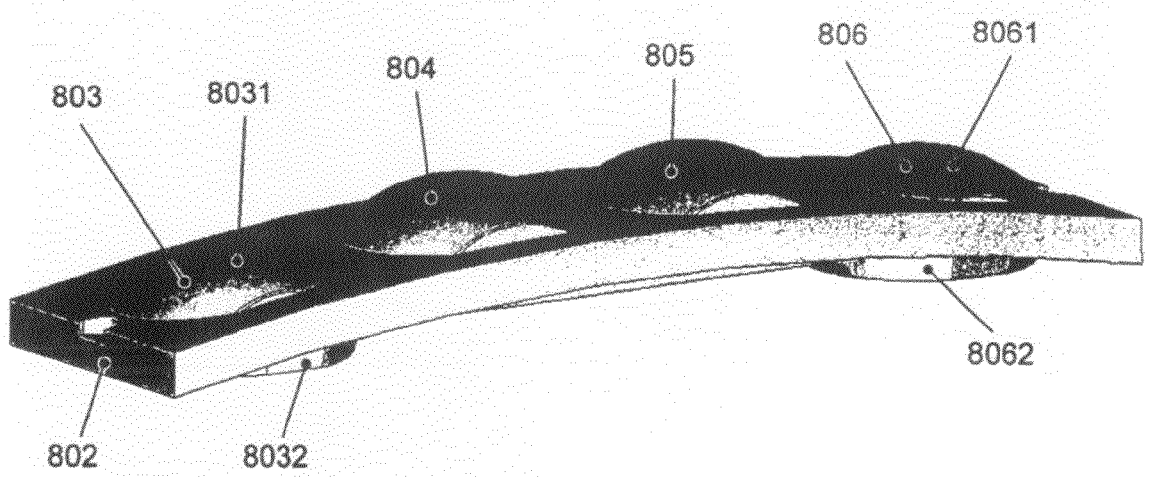
FIG. 18 shows a further exemplary embodiment of a transparent shaped part in a perspective illustration.
Figure 19:
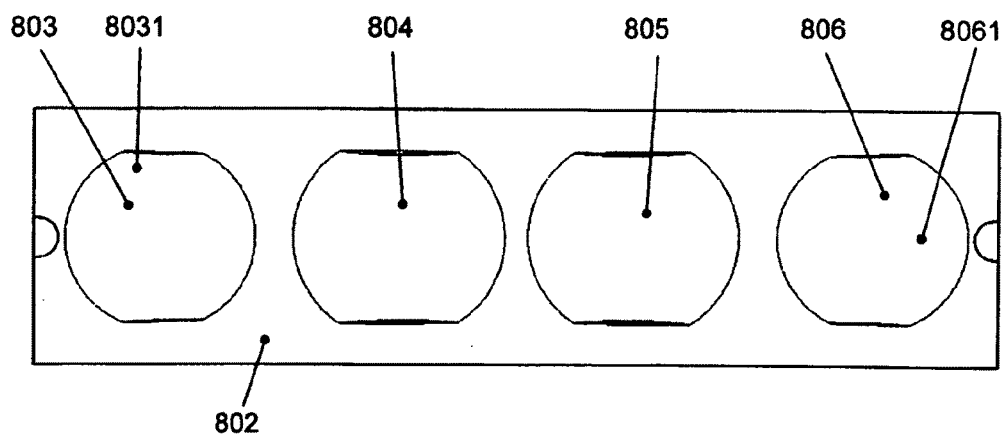
FIG. 19 shows a plan view of the transparent shaped part in accordance with FIG. 18.
Figure 20:
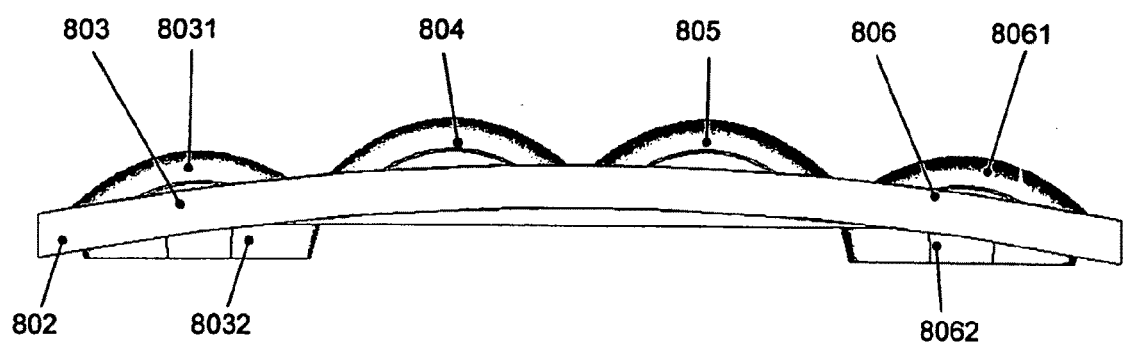
FIG. 20 shows a side view of the transparent shaped part in accordance with FIG. 18.
Figure 21:
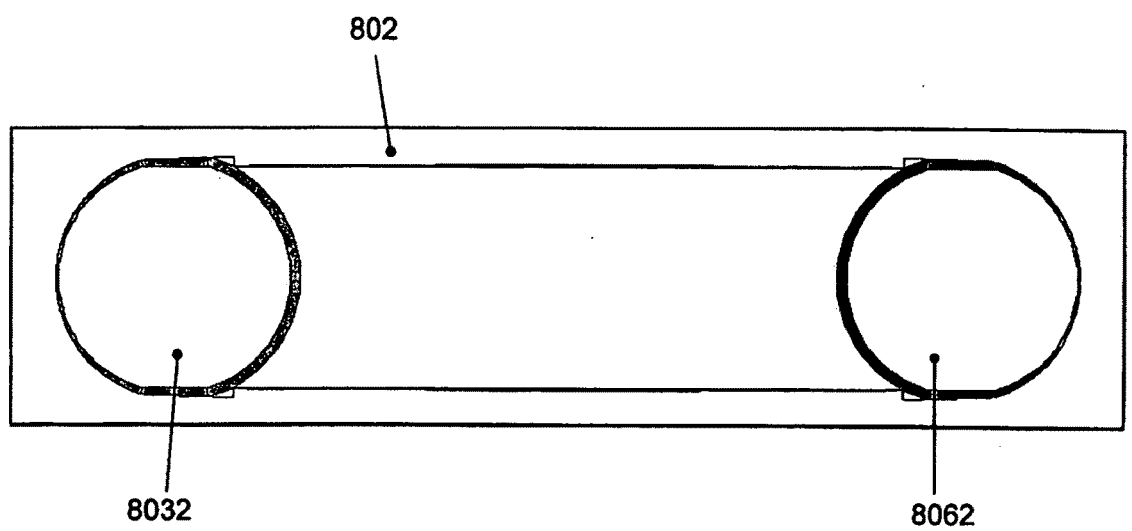
FIG. 21 shows a view behind the transparent shaped part in accordance with FIG. 18.

FIG. 18 shows a further exemplary embodiment of a curved transparent shaped part 802 in a perspective illustration, FIG. 19 shows a plan view of the transparent shaped part 802, FIG. 20 shows a side view of the transparent shaped part 802, and FIG. 21 shows a view behind the transparent shaped part 802. The transparent shaped part 802 comprises two optical structures 804 and 805, at least one of which in one configuration corresponds to the optical structure 3. Furthermore, the transparent shaped part 802 comprises two optical structures designated by reference symbols 803 and 806. The optical structure 803 comprises a convex, in particular aspherical, optical partial structure 8031 on its side remote from a light source and a cylindrical optical partial structure 8032 on its side facing a light source. The optical structure 806 comprises a convex, in particular aspherical, optical partial structure 8061 on its side remote from a light source and a cylindrical optical partial structure 8062 on its side facing a light source.

In a configuration, the transparent shaped parts 2, 102, 202, 302, 402, 502, 602, 702 and 802 substantially consist of glass or the transparent shaped parts 2, 102, 202, 302, 402, 502, 602, 702 and 802 comprise glass. However, the transparent shaped parts 2, 102, 202, 302, 402, 502, 602, 702 and 802 can also substantially consist of transparent plastic or comprise transparent plastic.

The elements and distances in FIGS. 1 to 14 are depicted taking account of simplicity and clarity and not necessarily as true to scale. Thus, e.g. the orders of magnitude of some elements or distances in FIGS. 1 to 14 are represented in an exaggerated manner relative to other elements or distances in order to improve the understanding of the exemplary embodiments of the present invention.

The invention claimed is:

1. A device comprising:
   a vehicle headlight comprising:
      a first light source;
      at least a second light source; and
      a transparent shaped part configured in one piece, the transparent shaped part comprising:
         a first convex lens for the direction of light emitted by the first light source; and
         at least a second lens selected from the group consisting of (a) convex lens and (b) concave lens for the direction of light emitted by the second light source,
      wherein a substantial part of the light which is emitted by the first light source and passes through the transparent shaped part emerges from the first lens,
      wherein the first light source in conjunction with the first convex lens directs light in a different direction from the second light source in conjunction with the second lens, and
      wherein the first light source and the first convex lens are configured to form a dipped-beam light.

2. The device according to claim 1, wherein a substantial part of the light which is emitted by the second light source and passes through the transparent shaped part emerges from the second lens.

3. The device according to claim 1, wherein the second light source comprises an LED.

4. The device according to claim 1, further comprising:
   at least a third light source, wherein the shaped part has at least a third lens for the direction of light emitted by the third light source.

5. The device according to claim 1, wherein the first lens is configured to image a bright-dark boundary.

6. The device according to claim 1, further comprising:
   a light shield, wherein an edge of the light shield can be imaged as a bright-dark boundary by means of the first lens.

7. The device according to claim 1, wherein the transparent shaped part substantially consists of glass.

8. The device according to claim 1, wherein the transparent shaped part forms an outer part of the vehicle headlight.

9. The device according to claim 1, wherein the first lens and the second lens each extend at least one centimeter in two orthogonal directions.

10. A device comprising:
    a vehicle headlight comprising:
       a first light source;
       at least a second light source; and
       a transparent shaped part configured in one piece, the transparent shaped part comprising:
          a first convex lens for the direction of light emitted by the first light source; and
          at least a second lens selected from the group consisting of (a) convex lens and (b) concave lens for the direction of light emitted by the second light source,
       wherein a substantial part of the light which is emitted by the first light source and passes through the transparent shaped part emerges from the first lens,
       wherein the first light source in conjunction with the first convex lens directs light in a different direction from the second light source in conjunction with the second lens,
       wherein the first light source and the first convex lens are configured to form a dipped-beam light, and
       wherein the second light source and the second lens are configured to form a static cornering light.

11. The device according to claim 10, wherein a substantial part of the light which is emitted by the second light source and passes through the transparent shaped part emerges from the second lens.

12. The device according to claim 10, wherein the second light source comprises an LED.

13. The device according to claim 10, further comprising:
    at least a third light source, wherein the shaped part has at least a third lens for the direction of light emitted by the third light source.

14. The device according to claim 10, wherein the first lens is configured to image a bright-dark boundary.

15. The device according to claim 10, further comprising:
a light shield, wherein an edge of the light shield can be imaged as a bright-dark boundary by means of the first lens.

16. The device according to claim 10, wherein the transparent shaped part substantially consists of glass.

17. The device according to claim 10, wherein the transparent shaped part forms an outer part of the vehicle headlight.

18. The device according to claim 10, wherein the first lens and the second lens each extend at least one centimeter in two orthogonal directions.

* * * * *